United States Patent
Osada et al.

(10) Patent No.: US 6,651,603 B2
(45) Date of Patent: Nov. 25, 2003

(54) ENGINE STARTING METHOD IN IDLING STOP CONDITION

(75) Inventors: Masahiko Osada, Okazaki (JP); Masato Hanai, Atsumi-gun (JP); Masahiro Katoh, Chiryu (JP); Masanori Ohmi, Anjo (JP); Mikio Saito, Motosu-gun (JP)

(73) Assignee: Denso Corporation, Kariya (JP)

( * ) Notice: Subject to any disclaimer, the term of this patent is extended or adjusted under 35 U.S.C. 154(b) by 107 days.

(21) Appl. No.: 09/849,274

(22) Filed: May 7, 2001

(65) Prior Publication Data

US 2001/0047785 A1 Dec. 6, 2001

(30) Foreign Application Priority Data

May 9, 2000 (JP) ........................................ 2000-135570
Sep. 14, 2000 (JP) ........................................ 2000-280407

(51) Int. Cl.[7] .............................................. F02N 17/00
(52) U.S. Cl. .................................................. 123/179.3
(58) Field of Search .......................... 123/179.2, 179.3; 290/38 R, 38 C (56) References Cited

U.S. PATENT DOCUMENTS

| | | | |
|---|---|---|---|
| 4,305,002 A | | 12/1981 | Mortensen |
| 4,418,289 A | * | 11/1983 | Mortensen ................. 307/142 |
| 4,551,630 A | * | 11/1985 | Stahura et al. ............ 290/38 R |
| 4,774,915 A | | 10/1988 | Nguyen et al. |
| 5,325,827 A | * | 7/1994 | Fasola ...................... 123/179.3 |
| 5,402,758 A | * | 4/1995 | Land et al. ............... 123/179.3 |
| 6,308,674 B1 | * | 10/2001 | Ruehle et al. ........... 123/179.3 |

FOREIGN PATENT DOCUMENTS

| | | |
|---|---|---|
| DE | 1022053 | 1/1958 |
| JP | A 60-259769 | 12/1985 |
| JP | 3081564 | 4/1991 |
| JP | 8261117 | 10/1996 |
| JP | 11030139 | 2/1999 |
| JP | 11218068 | 8/1999 |
| JP | 2000-45920 | 2/2000 |

* cited by examiner

*Primary Examiner*—Henry C. Yuen
*Assistant Examiner*—Arnold Castro
(74) *Attorney, Agent, or Firm*—Oliff & Berridge, PLC (57) ABSTRACT

The present invention provides an engine starting method from an idling stop condition wherein a preliminary step pushes a pinion to abut with a ring gear when a vehicle operating condition is in an idling stop condition, a starting step rotates the pinion into mesh with the ring gear by a motor upon receiving an engine start signal and thereafter an engine is started, and a restoring step is carried out after engine startup where the pinion is restored to an original position thereof. Also provided, when the engine is stopped, a pinion is meshed with a ring gear. Upon engine start-up, a pinion actuator disengages the pinion from the ring gear and a cutout portion engages an engaging piece to maintain the pinion disengaged. When the engine stops, a releasing actuator disengages the cutout portion and the engaging piece and the pinion is reset.

2 Claims, 7 Drawing Sheets

ENGINE STARTING METHOD IN IDLING STOP CONDITION

CROSS-REFERENCE TO RELATED APPLICATION

The present invention is related to Japanese patent application No. 2000-135570, filed May 9, 2000; 2000-280407, filed Sep. 14, 2000, the contents of which are incorporated herein by reference.

FIELD OF THE INVENTION

The present invention relates to an engine starter, and more particularly, to an engine starter for conservation.

BACKGROUND

For environmental, resource and fuel conservation, under the designation "eco-run", it is encouraged to be sure to turn OFF a vehicle engine, (i.e. stop idling) while waiting for traffic signal change. One developed technique includes placing the vehicle into an idling-stop condition, automatically, even without operation by the driver. Then, the engine is started automatically upon a start-up operation by the driver. In connection with such an eco-run technique, the starter is required to rapidly start an engine from the idling-stop condition to prevent traffic congestion and starter wear. The easiest way to accomplish this is to keep the starter pinion engaged with the engine ring gear.

This technique is disclosed, for example, in JP-A No. Hei 8-26117. However, if the pinion and the ring gear are constantly meshed, noise is generated by the engagement of both gears during vehicular running and the service life of the small diameter pinion, also having a small number of teeth, is shortened.

In view of such, JP-A No. Hei 11-30139 describes a starter solenoid coil being energized during the idling stop condition, thereby allowing the pinion to engage the ring gear, such that during engine start-up, the pinion is engaged with the ring gear and driven and rotated by a motor. However, this publication only provides: "a solenoid for controlling the engagement of the starter pinion is energized to mesh the pinion with the ring gear" during the idling stop condition.

However, mere energization of the solenoid often fails to engage the pinion with the ring gear. More particularly, the pinion is pushed out when the starter solenoid is energized, but if the teeth position of the pinion and of the ring gear are not coincident, the pinion and the ring gear will abut each other at the respective end faces and the pinion will not mesh with the ring gear. Therefore, with only the information disclosed in the above publication, it is impossible to bring the pinion into positive engagement with the ring gear for start-up.

Another technique to reduce engine starting time includes engaging a pinion with the ring gear beforehand with a pinion actuator. However, in the rest position (power OFF), the pinion is disengaged from the ring gear. So, during the idling stop condition, the pinion actuator must be turned ON to keep the pinion engaged with the ring gear, requiring constant electric power during idling which drains the battery especially when not being charged as the engine is not running.

SUMMARY OF THE INVENTION

In light of these and other drawbacks, the present invention utilizes a starting step and a restoring step in this order. In the preliminary starting step, the starter pinion is pushed out at least halfway by a push-out means to abut the pinion against or mesh with the ring gear. Pushing out the pinion moves the pinion axially toward the ring gear, including pushing the pinion out when seen from the motor side and pulling the pinion into the motor side. In the starting step (the second step), the pinion is rotated by a starter motor and meshed with the ring gear. Then, the engine is cranked and started. In the restoring step (the third step), the pinion is restored to its original position spaced away from the ring gear.

Accordingly, in an idling stop condition, the preliminary step is carried out, in which the pinion is pushed out at least halfway toward the ring gear by the push-out means of the starter. As a result, the starter pinion abuts or meshes with the ring gear. In many cases, the pinion teeth and the ring gear teeth are not positionally coincident, and the pinion abuts an end face of the ring gear and is pushed against the ring gear by the push-out means. However, if the pinion teeth and the ring gear teeth are positionally coincident, the pinion is pushed out sufficiently deep and meshes with the ring gear.

Next, if the vehicle driver releases the brake, the idling stop condition is cancelled and the starting step is carried out, rotating the pinion. Then, where the pinion abuts the ring gear in the above preliminary step, the pinion meshes with the ring gear during its one-pitch rotation and is further pushed into a sufficiently deep engagement with the ring gear. When the pinion meshes with the ring gear, since the pinion has already been pushed against the ring gear, the pinion engages the ring gear when it begins to rotate. This reduces engaging shock to an extremely slight degree. Conversely, when the pinion is already meshed with the ring gear in the preliminary step, the pinion rotates the ring gear immediately. In this way, after the pinion has meshed with the ring gear, the engine is cranked and started by a motor driving the pinion and the ring gear.

Lastly, the restoring step is carried out upon engine start-up, whereby the starter pinion is restored to its original position spaced away from the ring gear. Therefore, during normal engine operation, the pinion is spaced away from the ring gear and does not produce an engaging noise or wear. In principle, the restoring step is carried out after engine start-up, but the engine may not be started even after going through the starting step, though this is rarely the case. Therefore, the restoring step can be carried out also in such a case. However, the starter system preferably immediately re-starts.

In the preliminary step, the pinion abuts an end face of the ring gear or is meshed with the ring gear. Therefore, even if when the pinion starts rotating in the starting step, engaging shock is extremely small. Or, if the pinion is already engaged with the ring gear, no engaging shock occurs. As a result, noise and vibration is reduced and durability of the entire starter including the pinion is increased.

Secondly, in the preliminary step, the pinion abuts or engages the ring gear, as noted earlier. In the starting step, therefore, the pinion shifts to its engaged state with the ring gear immediately from its abutted state against the ring gear. Or, when the pinion is already meshed with the ring gear in the preliminary step, the engine is cranked upon rotation of the pinion. As a result, the engine is rapidly started.

Thirdly, in the restoring step, after engine start-up, the pinion returns to its original position and leaves the ring gear, so that during normal engine operation, the pinion is spaced away from the ring gear. Thus, the pinion does not rotate during normal engine operation and therefore the durability of the starter including the pinion is improved. Also, the quietness during vehicular operation is improved because the pinion does not generate an engaging noise during vehicular running. Thus, according to the engine starting method in an idling stop condition, engaging shock of the pinion is diminished and the engine is started rapidly from an idling stop condition.

In another aspect, the preliminary step includes a meshing step where the starter motor is energized for a very short time, causing the pinion to turn slightly and thereby keeping the pinion engaged with the ring gear. Accordingly, even if the starter pinion is once abutted against an end face of the ring gear in the preliminary step, the pinion can be kept engaged with the ring gear by energizing the starter motor for only a very short time in the meshing step. More specifically, if the motor is energized for only a very short time to turn the pinion only a little, since the pinion already abuts the ring gear, the pinion turns to an angular position where it meshes with the ring gear, and both are meshed. In this case, the pinion does not have to turn fully once. Instead, the pinion need to only turn to an angular position corresponding to one pitch of the pinion teeth. Alternatively, the short-time energization for the motor may be repeated plural times, and in this case a single turning angle of the pinion may be less than one pitch.

In the meshing step, the energization time for the motor is very short, so that the turning angular velocity of the pinion is very low in comparison with the starting step and the pinion turns slowly into mesh with the ring gear. As such, there is little engaging shock of the pinion and the durability of the starter is further improved. Besides, since the engaging shock is not sensed at all by occupants of the vehicle, there is no fear that the occupants may have any offensive feeling caused by the engaging shock.

Thus, if the meshing step is carried out in the preliminary step, the pinion is already in a sufficiently deep mesh with the ring gear when the starting step is carried out after termination of the idling stop condition. In the starting step, therefore, there is no engaging shock, whereby the noise and shock during start-up are suppressed and the durability of the starter is improved. Also, since the pinion is already meshed with the ring gear, the engine is cranked as soon as the starting step begins and thus the engine start-up is effected more rapidly.

According this second means, therefore, in addition to the foregoing effects attained by the first means, the quietness during engine start-up and the durability of the starter are further improved, and the starting of the engine becomes more rapid.

In another aspect, the pinion is brought into mesh with the ring gear beforehand to shorten the time required for starting the engine from the idling stop condition, thereby suppressing electric power consumption. The pinion actuator is disengaged upon engine start-up and the pinion is disengaged from the ring gear against the biasing force of the biasing means.

In the idling stop state, the pinion is meshed with the ring gear with the biasing force of the biasing means. Thus, the rest position is where the pinion is meshed with the ring gear with the biasing force of the biasing means. Even if the pinion meshes with the ring gear during engine stop, electric power is not consumed. Therefore, even if the vehicle stop time becomes long due to idling, or the vehicle stop frequency increases due to traffic congestion, battery consumption is suppressed.

Also, since the pinion meshes with the ring gear during idling stop, no meshing time is needed during engine start-up and hence the time required for engine starting from an idling stop condition is shortened.

In another aspect, when the pinion is disengaged from the ring gear, the pinion is kept disengaged from the ring gear by the mechanical engaging means, whereby no energy is needed for disengaging the pinion from the ring gear during operation of the engine. Consequently, current consumption is suppressed.

According to the means of claim 3, when the engine stops, the releasing actuator is operated to bring the pinion into mesh with the ring gear, whereby with a small power consumption it is possible to let the pinion return to a rest position (engaged position with the ring gear).

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION

In an engine starting method in an idling stop condition according to a first embodiment of the present invention, an engine is re-started from a vehicle temporary stop condition, that is, from an idling stop condition with the engine turned OFF. According to the engine starting method of this embodiment, a preliminary step, a starting step and a restoring step, which will be described later, are carried out in order using the starter system as shown in FIG. 1 to start an engine from an idling stop condition.

Figure 1:
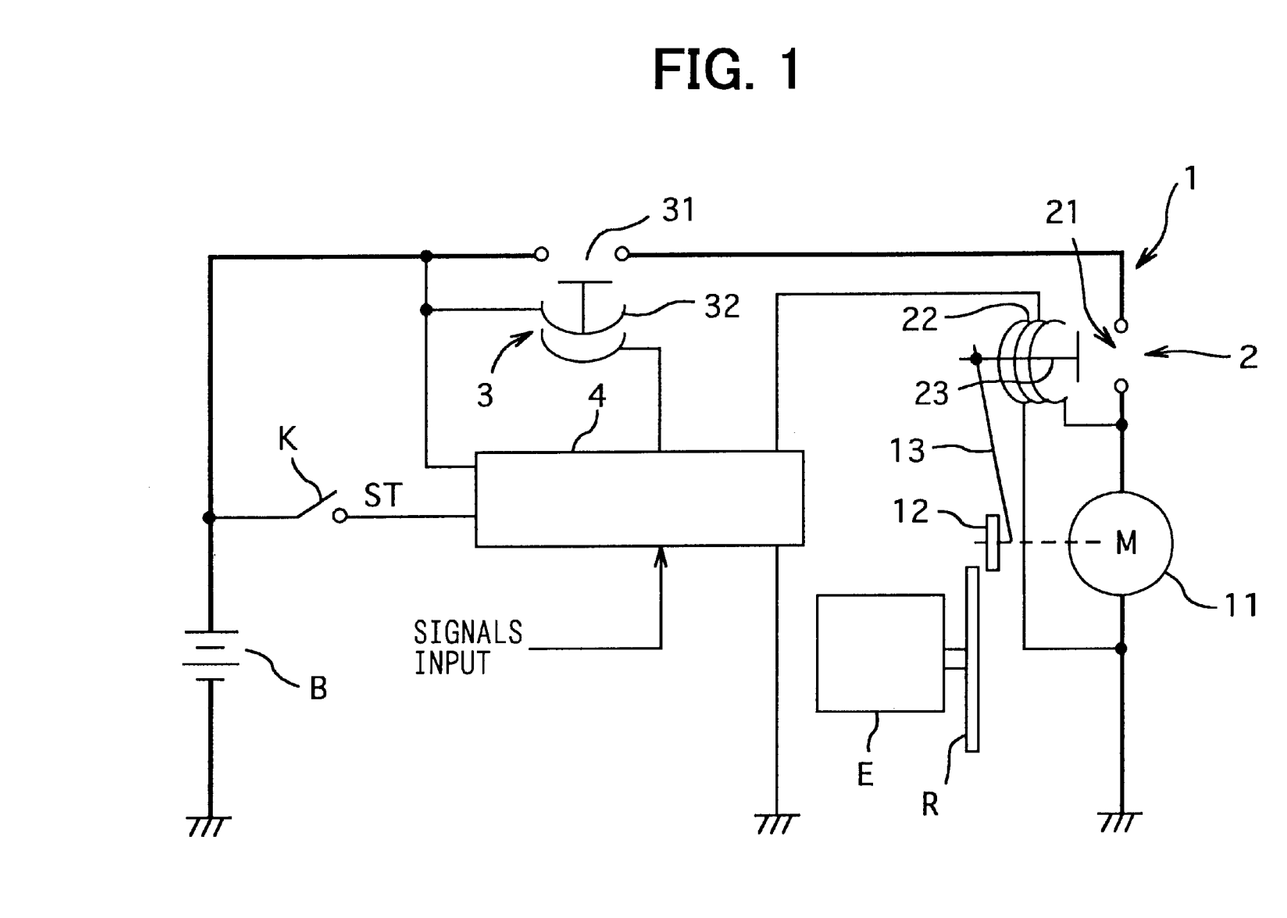
FIG. 1 is a schematic diagram showing a configuration of a starter system used in the first embodiment of the invention.

The starter system used in this embodiment, as shown in FIG. 1, includes a starter 1 provided with a magnet switch 2, a relay 3 for opening and closing a main contact 21 of the magnet switch 2 and a battery B, and a controller 4 that controls the starter 1 and the relay 3.

The starter 1 has a pinion 12 that is journaled to be movable axially. The magnet switch 2 serving as a push-out means that pushes out the pinion 12 toward ring gear R of engine E. A motor 11 drives the pinion 12 rotatively. The magnet switch 2 is provided with a solenoid coil 22 which comprises a pull-in coil and a holding coil, a plunger 23 is attracted by the solenoid coil 22, and the main contact 21 is opened and closed by the plunger 23. One end of a driving lever 13 with a driving spring (not shown) attached thereto is connected mechanically to one end of the plunger 23. The magnet switch 2 causes the pinion 12 to be pushed out toward or retracted from the ring gear R through the driving lever 13. Where the magnet switch 2 attracts the plunger 23 and the pinion 12 abuts an end face of the ring gear R, the pinion 12 is urged toward the ring gear R with the biasing force of the driving spring.

The relay 3 is a normally OFF type relay which opens and closes between a positive terminal of the battery B and a battery terminal of the main switch 21. Only while a relay coil 32 is energized by the controller 4, the relay 3 closes a relay contact 31.

The controller 4, which incorporates a microcomputer, controls the magnet switch 2 of the starter 1 and the relay 3 according to various signals, including an engine revolution signal and a brake pedal position signal.

In the engine starting method during an idling stop condition according to this embodiment, the engine is started from an idling stop condition by carrying out the preliminary step, the starting step and the restoring step in order.

Next, a description will be given below about main points of the preliminary step, the starting step and the restoring step. First, in the preliminary step, the pinion 12 of the starter 1 is pushed out at least halfway by the magnet switch 2 (a push-out means) so that the pinion abuts against or meshes with the ring gear R of the engine E. Next, in the starting step, the pinion 12 is driven rotatably by the motor 11 of the starter 1 and the rotating pinion is meshed with the ring gear R, then the engine is cranked and started. Lastly, in the restoring step, the magnet switch 2 is restored, thereby allowing the pinion 12 to return to its original position spaced away from the ring gear R. In this step the motor 11 is de-energized.

Figure 2:
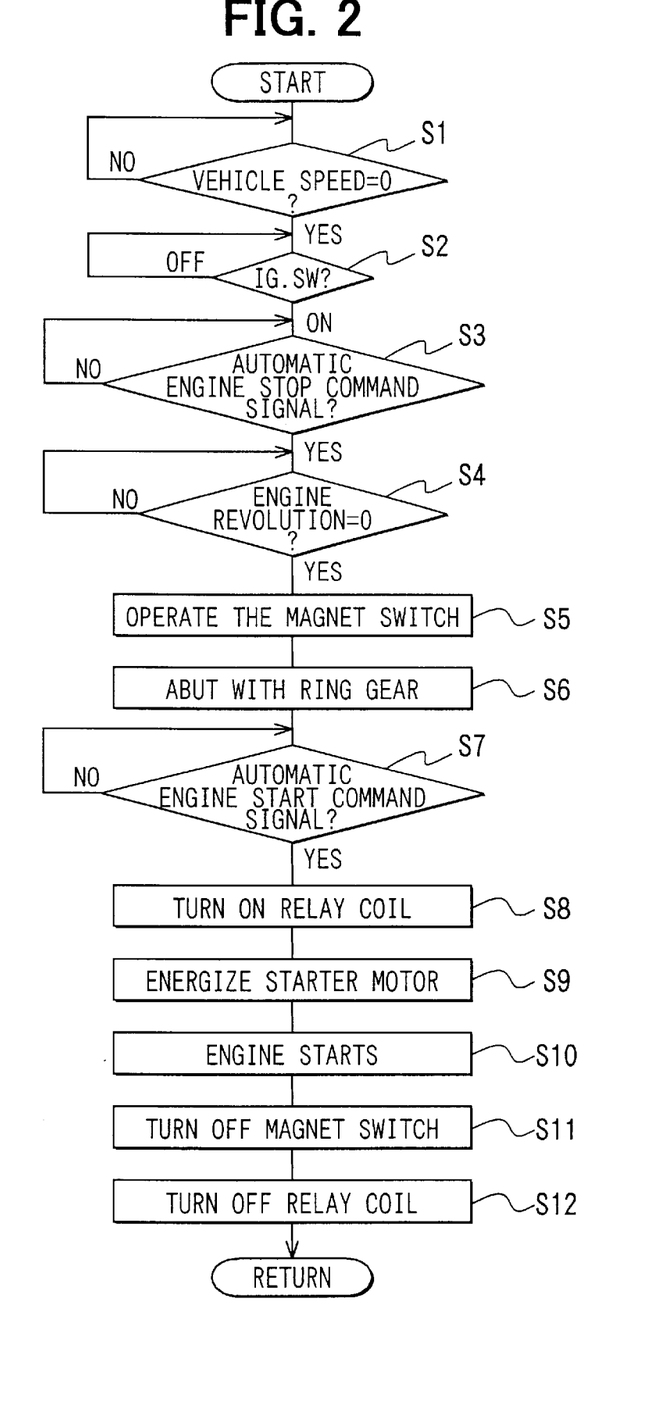
FIG. 2 is a flow chart showing a working procedure of the first embodiment of the invention.

The engine starting method during an idling stop condition according to this embodiment is carried out according to the procedure of a flow chart shown in FIG. 2. Before the engine starting method of this embodiment is carried out, steps S1 and S2 ensure that the vehicle has stopped with the ignition switch of key switch K turned ON. Subsequently, steps S3 and S4 ensure that upon receipt of a command signal for stopping the engine E automatically, the engine was stopped automatically and came into an idling stop condition.

Immediately thereafter, the preliminary step is carried out in processing steps S5 and S6, in which the magnet switch 2 operates and the pinion 12 is pushed against the ring gear R through the driving lever 13 with a driving spring attached thereto. In this state and during determining step S7, a stand-by state after termination of the preliminary step is maintained while waiting for a command signal generated, for example, upon release of the vehicle driver's foot from the brake pedal and which causes the engine E to start automatically.

If an engine E starting signal is automatically detected in step S7, the starting step is carried out in processing steps S8 to S10. The magnet switch 2 operated in the above preliminary step and the main contact 21 is already closed. So, if the relay coil 32 is energized and the relay contact 31 closes in the processing step S8, the motor 11 is energized in the processing step S9. As a result, the pinion 12 which is urged by the driving spring attached to the driving lever 13 turns into a deep mesh with the ring gear R. Further, the motor 11 drives and rotates the pinion 12, with consequent engine start-up. To ensure engine starting, for example, 11 is energized for a predetermined time sufficient for engine startup, or the ignition pulse from the engine or an output of a revolution sensor is detected.

If the engine starts in step S10, the restoring step is carried out last. More specifically, in a processing step S11, the solenoid coil 22 of the magnet switch 2 is de-energized. Then, when the plunger 23 is restored to its original position by a return spring (not shown), the pinion 12 also returns from the ring gear R to its original position through the driving lever 13. In a processing step S12, the relay coil 32 is de-energized and the relay contact 31 returns to its original open position. Now, a series of engine starting operations in an idling stop condition are completed.

Thereafter, the determination logic in FIG. 2 again returns to Start, waiting for the next idling stop condition.

(Function and Effect of the First Embodiment)

Since the engine starting method in an idling stop condition according to the present invention is constructed as described above and is carried out according to the above procedure, there are attained the following functions and effects.

First, when an idling stop condition occurs, the preliminary step (processing steps S5 and S6) is carried out and the starter pinion 12 is pushed out at least until abutment against the ring gear R of the engine E by the magnet switch 2 of the starter 1. As a result, the pinion 12 abuts against or meshes with the ring gear R. Since in many cases the pinion teeth 12 and the teeth of the ring gear R are not in positional coincidence with each other, the pinion abuts against an end face of the ring gear R and is urged against the ring gear by the magnet switch 2 and the driving spring. On the other hand, where the pinion teeth and the ring gear teeth are positionally coincident, the pinion 12 is pushed out sufficiently deeply into mesh with the ring gear R.

Next, upon release of the brake by the vehicle driver, the idling stop condition is canceled and the starting step (processing steps S8–S10) is carried out, in which the pinion 12 is rotated by the motor 11 of the starter 1. As a result, where the pinion 12 was abutted against the ring gear R in the preliminary step described above, the pinion 12 meshes with the ring gear during one-pitch rotation of the pinion and is further pushed into a sufficiently deep mesh with the ring gear. When the pinion 12 meshes with the ring gear R, since the pinion has already been pushed against the ring gear and engages the ring gear as soon as it starts rotating, engaging shock is suppressed to an extremely small degree. On the other hand, where the pinion 12 is already meshed with the ring gear R in the preliminary step, the pinion rotates the ring gear immediately. Thus, after the pinion 12 has meshed with the ring gear R, the engine E is cranked by the motor 11 via the pinion and the ring gear and is thus started.

Lastly, upon engine start-up E, the restoring step (processing steps S 11 and S12) is carried out, whereby the pinion 12 of the starter 1 is restored to its original position spaced away from the ring gear R of the engine. Therefore, the pinion 12 is spaced away from the ring gear R during normal engine operation E and the pinion does not generate engaging noise or wear.

Since the engine starting method in an idling stop condition according to this embodiment operates as above, there are obtained the following three effects. First, in the preliminary step, the pinion 12 abuts an end face of the ring gear R or already meshed with the ring gear. Therefore, even if the pinion 12 starts rotating in the starting step, engaging shock thereof is extremely small. Or, if the pinion is already engaged with the ring gear, no engaging shock occurs. As a result, not only is noise and vibration caused by engaging shock of the pinion 12 reduced during start-up, but also the durability of the starter 1 including the pinion is improved.

Secondly, in the preliminary step, the pinion 12 abuts or already is engaged with the ring gear R, as noted earlier. In the starting step, therefore, the pinion 12 shifts to its engaged state with the ring gear R immediately from its abutted state against the ring gear. Or, where the pinion 12 is already meshed with the ring gear R in the preliminary step, the engine E is cranked upon rotation of the pinion. As a result, engine E can be started rapidly with little delay.

Third, in the restoring step, after engine start-up the pinion 12 returns to its original position and leaves the ring gear R, so that during normal engine operation E, the pinion is spaced away from the ring gear. Thus, the pinion 12 does not rotate during normal engine operation E and therefore the durability of the starter 1 including the pinion is improved. Also, the quietness during vehicular running is improved as the pinion 12 does not generate an engaging noise during vehicular running.

Thus, according to the engine starting method during an idling stop condition of this embodiment, engaging shock upon engagement of the pinion 12 with the ring gear R is diminished and the engine E can be started rapidly from an idling stop condition while attaining both high durability of the starter 1 and quietness during vehicular running.

In the preliminary step, a meshing step can be used that involves energizing the motor 11 of the starter 1 for only a very short time, causing the pinion 12 to turn slightly and thereby keeping the pinion engaged with the ring gear R. According to this modification, even if the pinion 12 of the starter 1 is abutted against an end face of the ring gear R of the engine E in the preliminary step, the pinion can be kept engaged with the ring gear by energizing the motor 11 of the starter 1 for only a very short time in the meshing step. More specifically, if the motor 11 is energized for only a very short time to turn the pinion 12 only a little, since the pinion already abuts the ring gear and is urged by the driving spring, the pinion turns to an angular position in which it meshes with the ring gear R, and both are meshed. In this case, the pinion 12 need not turn fully once, but can turn to an angular position corresponding to one pitch of the pinion teeth. Alternatively, the short-time energization for the motor 11 may be repeated multiple times, and a single turning angle of the pinion 12 may be less than one pitch.

During the meshing step, the energization time for the motor 11 is very short, so that the turning angular velocity of the pinion 12 is very low in comparison with that in the starting step. As such, the pinion turns slowly into mesh with the ring gear R. For this reason, there is little engaging shock of the pinion 12 and the durability of the starter 1 is further improved. Also, the engaging shock is not sensed by the vehicle occupants.

Thus, if the meshing step is carried out in the preliminary step, the pinion 12 is already in a sufficiently deep mesh with the ring gear R when the starting step is carried out after termination of the idling stop condition. In the starting step, therefore, no engaging shock occurs, whereby the noise and shock during engine start-up are suppressed and the durability of the starter 1 is improved. Besides, since the pinion 12 is already meshed with the ring gear, the engine E is cranked as soon as the starting step begins and thus engine start-up is effected more rapidly. According to this modification, therefore, in addition to the foregoing effects attained by the first embodiment, the quietness during engine start-up and the durability of the starter 1 are further improved and the starting of the engine becomes more rapid.

Figure 3:
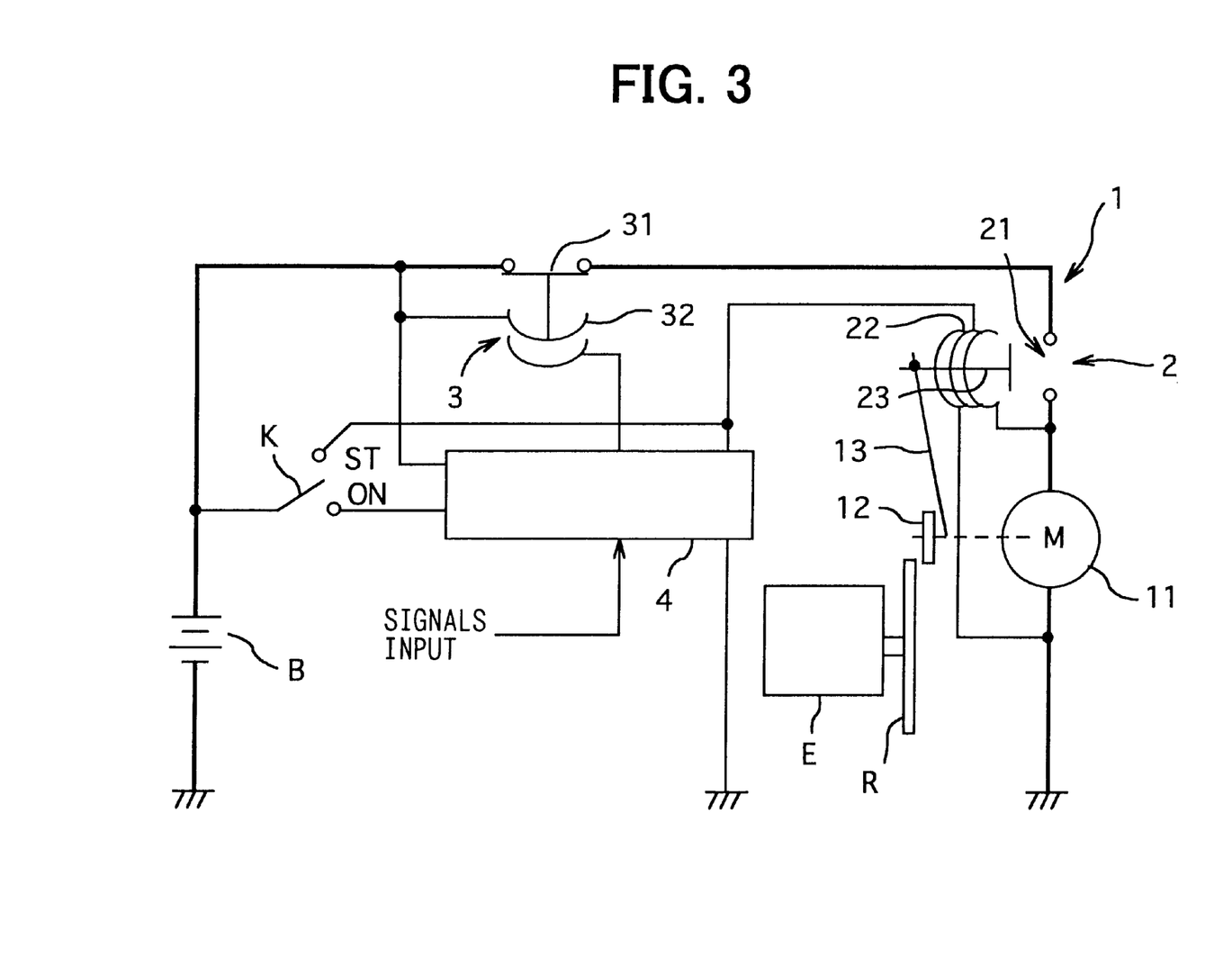
FIG. 3 is a schematic diagram showing a starter system in a second embodiment of the invention.

In a starter system used for an engine starting method in an idling stop condition according to the second embodiment of the present invention, as shown in FIG. 3, a relay 3 is normally ON and a relay contact 31 is closed when a relay coil 32 is not energized. The starter system used in this embodiment is different from the starter system used in the first embodiment. In this embodiment, moreover, the configuration of a key switch K used is also somewhat different from that used in the starter system in the first embodiment. The key switch K used in the second embodiment has a solenoid coil 22 as a magnetic switch that can be energized directly from the battery B. Accordingly, the control logic in the controller 4 is also properly modified from that used in the first embodiment. Also, the starter system used in this embodiment is basically the same as that used in the first embodiment. As such, even if controller 4 should fail, making it impossible to energize the relay coil 32 of the relay 31, engine E can be started. More specifically, since the relay contact 31 is closed, the engine E can be started by operating the key switch K manually and thereby causing the magnet switch 2 to operate directly from the battery B.

(Starting Method in the Second Embodiment)

The engine starting method in an idling stop condition according to the second embodiment of the present invention includes a preliminary step, a starting step and a restoring step, with a meshing step being included in an initial stage of the preliminary step. The engine starting method of this embodiment will be described below according to the procedure illustrated in a flow chart of FIG. 4.

Figure 4:
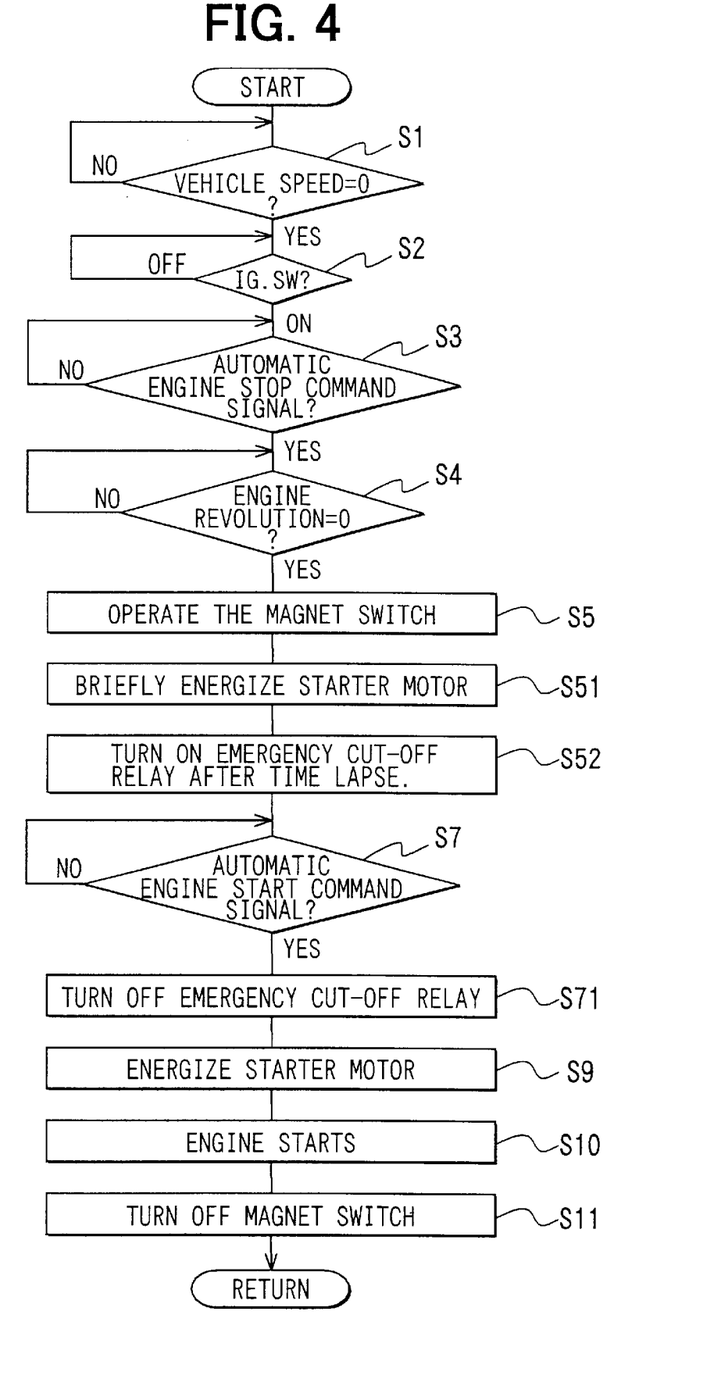
FIG. 4 is a flow chart showing a working procedure of the second embodiment.

The engine starting method in an idling stop condition according to this embodiment is the same as in the first embodiment until it is determined in steps S1 to S4 that the vehicle has entered into an idling stop condition. In the idling stop condition, the preliminary step is carried out, and in a processing step S5 the magnet switch 2 operates and the pinion 12 is pushed out at least halfway so as to abut or engage with the ring gear R. At this time, the relay contact 31 of the relay 3 is closed, so upon closing of the main contact 21 of the magnet switch 2, the motor 11 of the starter 1 is energized for only a very short time in step S51. In the processing step S52 which follows, the relay coil 32 is energized after the lapse of a predetermined time, and until opening of the relay 31 the motor 11 is energized and the pinion 12 is turned only slightly. As a result, the pinion 12 meshes with the ring gear R and is pushed more deeply into mesh with the ring gear R firmly by means of the magnet switch 2 and the driving lever 13. Thus, in an initial stage of the preliminary step there is carried out a meshing step wherein the motor 1 is energized for only a very short time to rotate the pinion only slightly, thereby keeping the pinion engaged with the ring gear.

After the relay 3 has opened and the supply of electric power to the motor 11 of the starter 1 has been cut off, the flow shifts to a determining step S7, which waits for a command signal to issue for starting the engine E automatically from an idling stop condition. When this automatic start command signal is detected, the supply of electric power to the relay coil 32 of the normally closed relay 3 is stopped in a processing step S71, the relay contact 31 closes and the motor 11 of the starter 1 is energized. As a result, the engine E starts at processing step S10. In a processing step S11, which follows, the supply of electric power to the solenoid coil 22 of the magnetic switch 2 is stopped and the magnet switch and the pinion 12 return to their original positions.

Thus, in steps S71 to S10 the starting step wherein the pinion 12 is rotated by the motor 11 and the engine E is cranked and started through the pinion 12 meshing with the ring gear R is carried out. Subsequently, in step S11, the pinion 12 is restored to its original position of being spaced apart from the ring gear R as in the first embodiment.

In this embodiment, the engaging shock between the pinion 12 and the ring gear R is diminished and the engine E can be started rapidly from an idling stop condition while satisfying both durability of the starter 1 and quietness. Also, since the pinion 12 is already meshed with the ring gear R in the preliminary step, the quietness during engine startup and the durability of the starter 1 are further improved. In addition, the engine is started more rapidly.

Further, as noted earlier, even if the controller 4 fails, making it impossible to energize the relay coil 32 of the relay 3, since the relay contact 31 is closed, the engine E can be started by operating the key switch K and thereby actuating the magnet switch 2 directly from the battery B. In this and the previous embodiments, a popular starter 1 that is mass-produced can be used in the starter system, not requiring a newly configured starter. Thus, it is possible to effectively utilize an existing manufacturing equipment.

[Third Embodiment]

Figure 5:
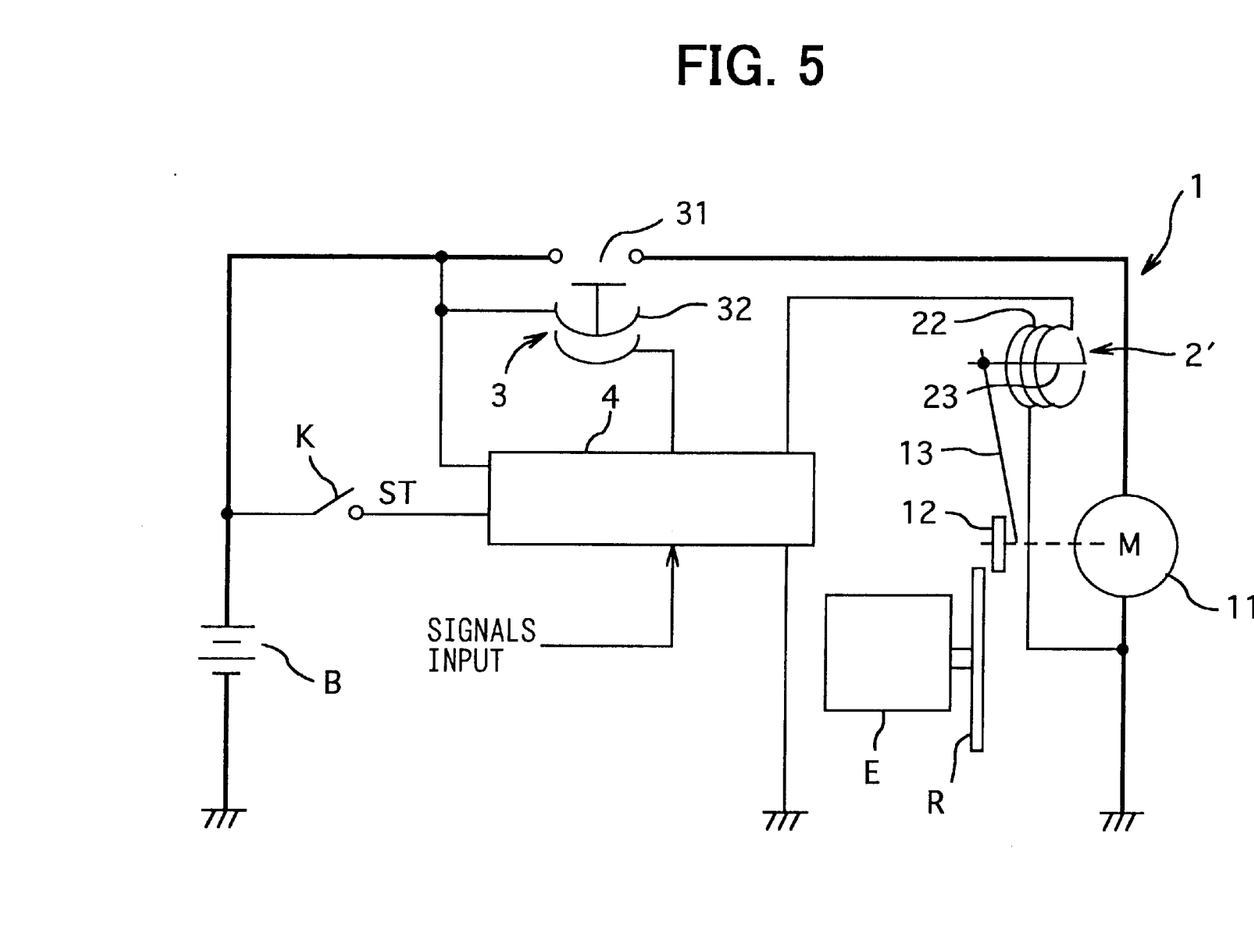
FIG. 5 is a schematic diagram showing a starter system in the third embodiment of the invention.

A starter system used in an engine starting method in an idling stop condition according to the third embodiment of the present invention replaces the magnet switch 2 used in the first embodiment with an attracting solenoid 2' not having the main switch 21. Other constructional points of the starter system of this third embodiment are the same as in the starter system of the first embodiment. Also, the control logic of the controller 4 for the solenoid 22 and the relay 3 is the same as in the first embodiment. Since a starter 1 uses the attracting solenoid 2' not having the main contact 21 in place of the magnet switch 2, the starter 1 is manufactured inexpensively.

The working procedure of the present embodiment is carried out according to the flow chart of FIG. 2, provided the magnet switch 2 is replaced by the attracting solenoid 2' in processing steps S5 and S11. It is possible to practice an engine starting method in an idling stop condition including a meshing step corresponding to the first modification of the first embodiment.

Figure 6:
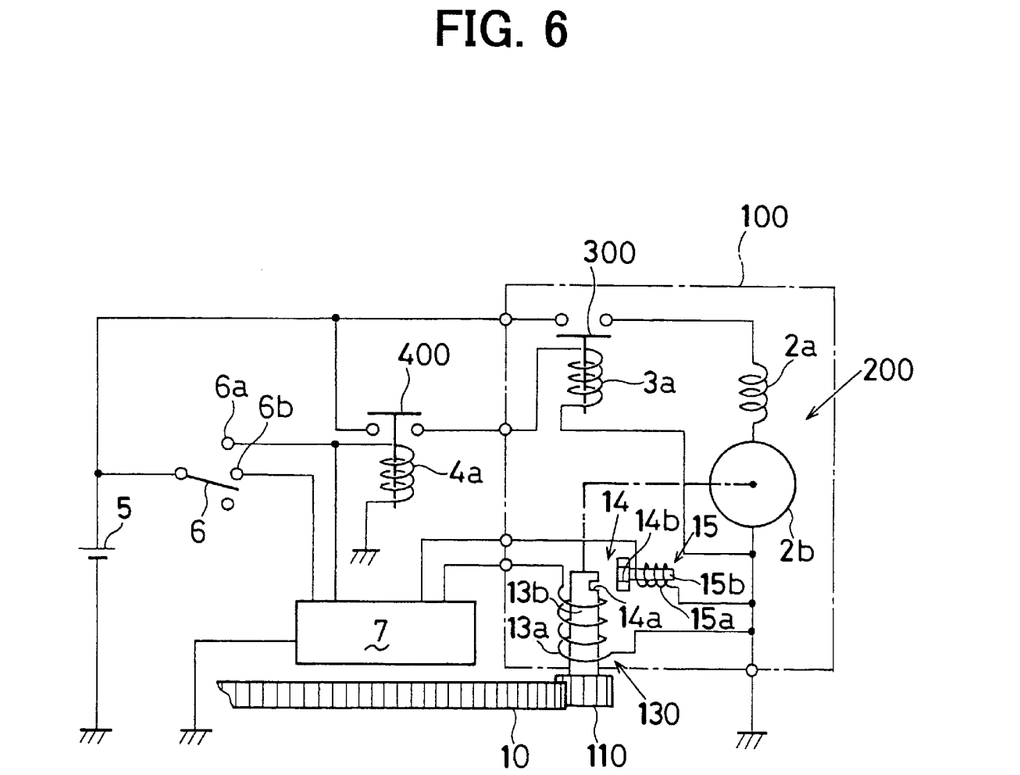
FIG. 6 is a schematic diagram of a starter system for a vehicle according to the invention.

A fourth embodiment is now described. FIG. 6 is an energizing circuit diagram in a starter system for a vehicle embodying the present invention. A starter 100 for starting an engine is provided with a starter motor 200 for cranking an engine and a magnet switch 300 for turning ON and OFF the starter motor 2. The starter motor 200 is a well-known starter which when energized produces a torque for driving the engine. In this embodiment, the starter motor 200 is composed of a field coil 2a and an armature 2b with an armature coil mounted thereon.

A coil 3a of the magnet switch 300 is connected to a vehicular battery through a starter relay 4. Upon turning ON of the starter relay 4, the coil 3a of the magnet switch 300 is energized and produces a magnetic force to turn ON the magnet switch 300, which is a normally open movable contact. In this embodiment, there are two energizing circuits that energize coil 4a of the starter relay 4.

In one energizing circuit, the coil 4a of the starter relay 400 is directly connected to the battery 5 through a key switch 6, and when the key switch 6 is connected to a starter terminal 6a, the coil 4a of the starter relay 400 is energized and produces a magnetic force to turn ON the starter relay 400 which is a normally open movable contact. In the other energizing circuit, when the key switch 6 is connected to an ON terminal 6b, a starting control means ("starting ECU" hereinafter) 7 energizes the coil 4a of the starter relay 4, whereupon the starter relay 400 turns ON.

As noted above, the starting ECU 7, which controls the starter relay 4, operates to start the engine when the vehicle starts moving from a stop condition, such as from a traffic signal.

More specifically, while the starting ECU 7 receives an "automatic start signal" from an engine control means (an ECU for the engine), the magnet switch 300 is turned ON to energize the starter motor 2. The ECU for the engine is provided with an eco-run system control section for an eco-run system which, when the accelerator pedal is released and the brake is depressed, stops the engine automatically and causes the engine to start before the vehicle starts moving after release of the brake. For starting the engine from stop by the eco-run system, the Engine ECU outputs the foregoing automatic start signal to the starting ECU 7.

Figure 7:
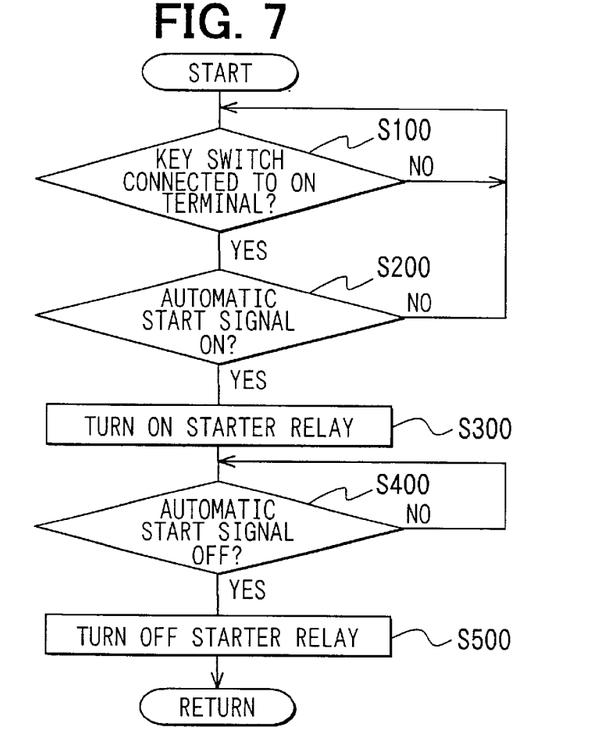
FIG. 7 is a flow chart showing control for a starter motor according to the invention.

Next, referring to FIG. 7, a description is given for controlling the starter motor 200 by the starting ECU 7. First, the ECU 7 determines if the key switch 6 is connected to the ON terminal 6b (step S 100). If it is not, the flow returns to step S100. If so, a whether the automatic start signal has been received from the Engine ECU (step S2) is determined. If the result in step S200 is negative, the flow returns to step S100.

If step S200 determines the Engine ECU has emitted the automatic start signal, the coil 4a of the starter relay 400 is energized (step S300). As a result, the starter relay 400 turns ON, the coil 3a of the magnet switch 300 is energized to turn ON the magnet switch, and the battery 5 is connected to the starter motor 2, so that the starter motor 200 cranks the engine.

Next, whether the automatic start signal transmitted from the Engine ECU has terminated (step S4) is determined. In other words, whether the engine has started with start-up of the starter motor 2, the engine speed N is larger than a predetermined level NO (N>N0) and the Engine ECU has stopped emitting the automatic start signal is determined. If the result is negative, the flow returns to step S400 because the starting of the engine has not been completed yet. If step S400 is affirmative (engine started), starter 100 is stopped. That is, the coil 4a of the starter relay 400 is turned OFF to turn OFF the magnet switch 300 (step S500). As a result, the starter motor 200 is de-energized and the starter 100 stops.

The starter 100 is provided with a pinion 110 capable of being engaged with and disengaged from a ring gear 10 of the engine. The pinion 110 is driven rotatively by the starter motor 2. The pinion 110 is set at a position where it is engaged with the ring gear 10 by a biasing force of a metallic spring (corresponding to the biasing means, not shown). The starter 100 is provided with a pinion actuator 130 for disengaging the pinion 110 from the ring gear 10 against the biasing force of the spring. The pinion actuator 130 used in this embodiment is made up of a pinion actuating coil 13a and a pinion actuating solenoid 13b which causes the pinion 110 to be disengaged from the ring gear 10 with a magnetic force generated by the pinion actuating coil.

The pinion actuating solenoid 13b is operated by a control means for disengagement which is programmed in the starting ECU 7. The control means for disengagement causes the pinion actuator 130 to operate during engine start-up, thereby disengaging the pinion 110 from the ring gear 10. A concrete example will now be given. The starting ECU 7 is provided to input the engine speed from the Engine ECU and cause the pinion actuator 130 to operate for disengaging the pinion 110 from the ring gear 10 upon increase of the engine speed N to a greater extent than the predetermined level NO (N>N0).

The starter 100 is provided with a mechanical engaging means 14 which, upon disengagement of the pinion 110 from the ring gear 10, mechanically engages a member (the pinion actuating solenoid 13b in this embodiment) which moves integrally with the pinion 110, to keep the pinion disengaged from the ring gear 10. The mechanical engaging means is an engaging cutout portion 14a formed in the pinion actuating solenoid 13b and an engaging piece 14b for engagement with the cutout portion 14a. Upon disengagement of the pinion 110 from the ring gear 10, the engaging piece 14b engages the cutout portion 14a automatically to keep the pinion 110 disengaged from the ring gear 10. The pinion actuating solenoid 13b slides integrally with the pinion 110 and is rotatable with respect to the pinion 110 and does not rotate when the pinion 110 rotates.

Further, the starter 100 is provided with a releasing actuator for releasing the mechanically engaged state of the mechanical engaging means 14. The releasing actuator 15 used in this embodiment includes a releasing coil 15a and a releasing solenoid 15b provided with the engaging piece 14b which is disengaged by a magnetic force generated from the releasing coil 15a.

The releasing solenoid 15b is operated by a control means for engagement which is programmed in the starting ECU 7. When the engine is OFF, the control means for engagement causes the releasing actuator 15 to operate and release the mechanically engaged state of the mechanical engaging means 14, thereby allowing the pinion 110 to mesh with the ring gear 10. As an example, when the engine speed N, input from the Engine ECU, becomes zero (N=0), the releasing actuator 15 is operated to let the pinion 110 engage the ring gear 10.

Figure 8:
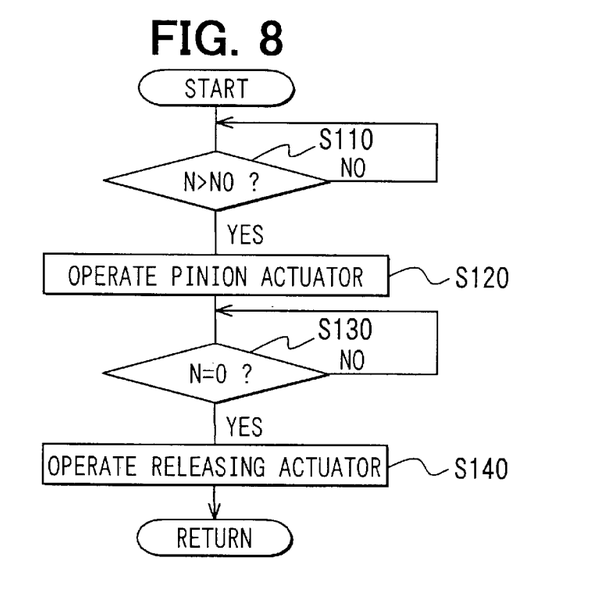
FIG. 8 is a flow chart showing control for both a pinion actuator and a releasing actuator according to the invention.

Next, with reference to a flow chart of FIG. 8, a description will be given below about controlling the pinion actuator 130 and the releasing actuator 15 by the starting ECU 7. The starting ECU 7 first determines whether the engine is operating (step S11). That is, the starting ECU 7 determines whether the engine has been started manually or by the eco-run system. More specifically, the starting ECU determines whether the engine speed N, after engine start-up, is higher than the predetermined engine speed NO (N>N0). If the result in step S110 is negative, the ECU 7 determines that the engine has not been started, and the flow returns to step S110 to keep the pinion 110 and the ring gear 10 engaged with each other.

If the result in step S110 is affirmative, i.e., if the engine has started, the pinion actuator 130 disengages the pinion 110 from the ring gear 10 (step S120). more specifically, the pinion actuating coil 13a is turned ON until complete disengagement of the pinion 110 from the ring gear 10, causing the pinion to be disengaged from the ring gear 10. The timing at which the pinion actuating coil 13a is to be turned OFF may be set using a timer or by disposing a sensor in such a manner that the pinion actuating coil 13a is turned OFF upon disengagement of the pinion 110 from the ring gear 10. When the pinion 110 is disengaged from the ring gear 10, the cutout portion 14a of the pinion actuating solenoid 13b engages the engaging piece 14b, whereby the pinion 110 is kept disengaged from the ring gear 10.

Next, whether the engine has stopped is determined in step S130. That is, a determination is made as to whether the engine has been stopped manually or by idling stop using the eco-run system. More specifically, whether the engine speed N is zero is determined (N=0). If not, the engine is operating, and flow returns to step S130 to keep the pinion disengaged from the ring gear. If not, however, and the engine stops, the releasing actuator disengages the cutout portion 14a and the engaging piece 14b from each other (step S140). That is, the releasing coil 15a is turned ON temporarily to release the engagement between the cutout portion 14a and the engaging piece 14b. As a result, the pinion 110 is pushed back to the rest position and meshes with the ring gear 10 by the action of the spring.

(Effect of the Embodiment)

As shown in this embodiment, when the engine is stopped manually by the key switch 6 or when the engine is stopped by idling stop using the eco-run system, the pinion 110 is meshed with the ring gear 10 with the biasing force of the spring. Thus, since the rest position is where the pinion 110 engages the ring gear 10, even if both engaged together while the engine stops, electric power is not consumed. Therefore, even if the vehicle stop time becomes long due to idling stop or even if the frequency of vehicle stop due to traffic congestion increases, the consumption of the battery 5 is suppressed.

While the engine stops, as mentioned above, the pinion 110 is meshed with the ring gear 10, so that no engaging time is needed when the engine starts and it is possible to shorten the time required for starting the engine in the eco-system. When the engine starts, the pinion actuator 130 operates and the pinion 110 is disengaged from the ring gear 10. As a result, the engaging piece 14b engages the cutout portion 14a formed in the pinion actuating solenoid 13b, whereby the pinion 110 is kept disengaged from the ring gear 10. Consequently, it becomes unnecessary to supply energy for disengaging the pinion 110 from the ring gear 10 while the engine is operating and hence it is possible to suppress the consumption of an electric current during operation of the engine.

When the engine stops, the releasing actuator 15 operates to disengage the cutout portion 14a and the engaging piece 14b from each other, so that the pinion 110 is pushed back to its rest position by the action of the spring as the biasing means. Consequently, with small power consumption, it is possible to bring back the pinion 110 to the position of engagement with the ring gear 10 which position is the rest position.

Thus, the starter 100 described in this embodiment not only permits shortening of the engine starting time but also permits suppressing the amount of electric power which the engine starter system including the starter 100 consumes for the eco-run system.

The circuit configuration, the configuration of the starter 100 and how to control described in the above embodiment are merely an example for explaining the embodiment and may be changed as necessary.

While the above-described embodiments refer to examples of usage of the present invention, it is understood that the present invention may be applied to other usage, modifications and variations of the same, and is not limited to the disclosure provided herein.

What is claimed is:

1. A starter system for a vehicle, comprising:
   a pinion engagable with a ring gear of an engine;
   a starter motor that rotatably drives the pinion;
   a biasing means for engaging the pinion with the ring gear;
   a pinion actuator for disengaging the pinion from the ring gear against a biasing force of the biasing means;

a mechanical engaging means which mechanically engages with a member adapted to move integrally with the pinion to keep the pinion disengaged from the ring gear when the pinion is disengaged from the ring gear by the pinion actuator; and a control means for disengagement which causes the pinion actuator to operate during engine start-up, thereby causing the pinion to be disengaged from the ring gear, wherein the pinion is in at least one of an abutting position and a meshing position with the ring gear when the engine is turned OFF.

2. A starter system for a vehicle according to claim 1, further comprising:

a releasing actuator for releasing the engaged state of the mechanical engaging means; and a control means for engagement which causes the releasing actuator to mesh the pinion with the ring gear when the engine stops.

* * * * *